July 6, 1926.                                          1,591,481
                    W. N. FRANK
                       GAUGE
              Filed Sept. 10, 1923         2 Sheets-Sheet 1
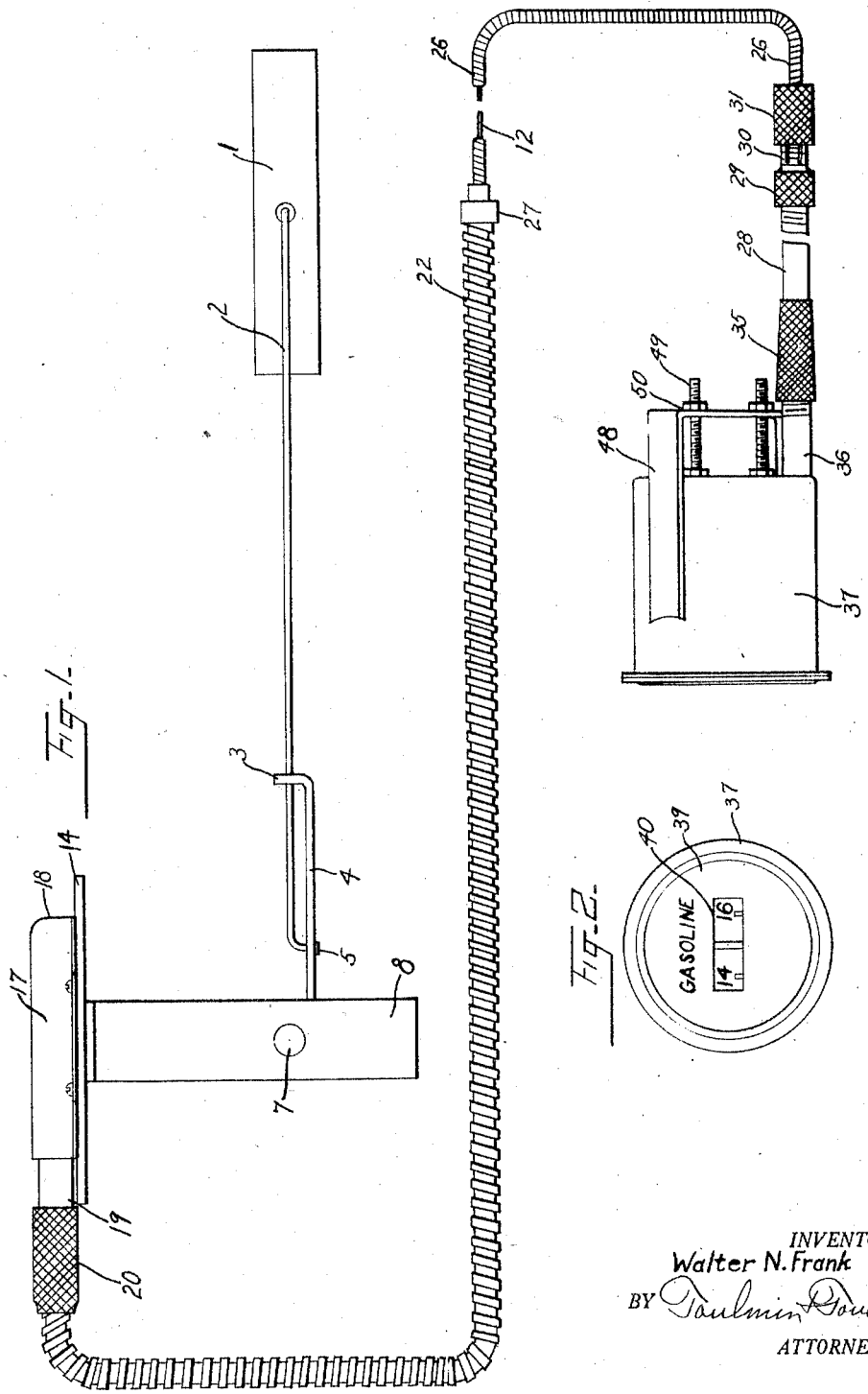
INVENTOR.
Walter N. Frank
BY Toulmin Toulmin
ATTORNEYS.

July 6, 1926.
W. N. FRANK
GAUGE
Filed Sept. 10, 1923    2 Sheets-Sheet 2
1,591,481
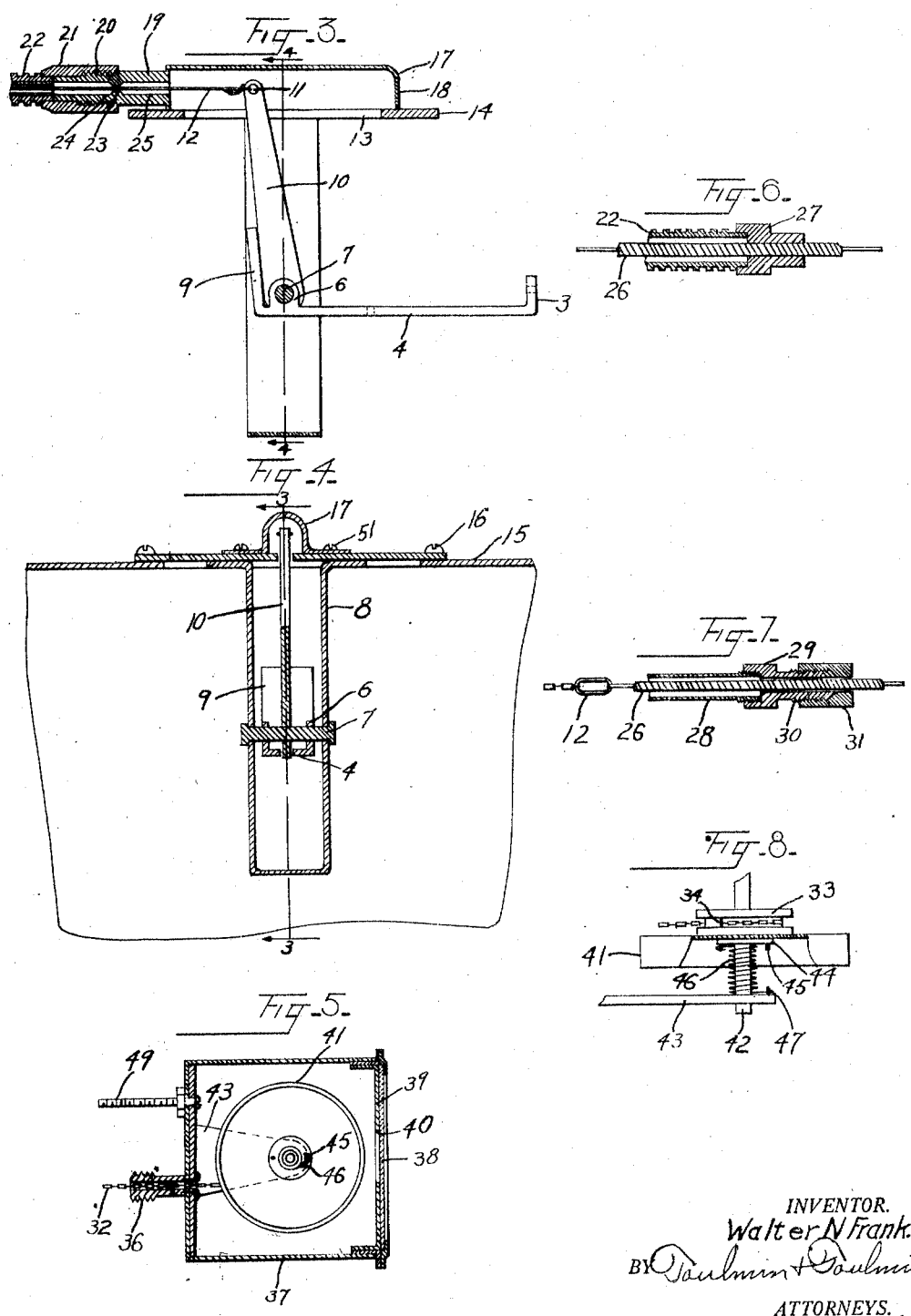
INVENTOR.
Walter N Frank.
BY Toulmin + Toulmin,
ATTORNEYS.

Patented July 6, 1926.

1,591,481

UNITED STATES PATENT OFFICE.

WALTER N. FRANK, OF DAYTON, OHIO, ASSIGNOR TO THE GROLAN MANUFACTURING COMPANY, OF DAYTON, OHIO, A CORPORATION OF DELAWARE.

GAUGE.

Application filed September 10, 1923. Serial No. 661,803.

My invention relates to gauges, and particularly to gauges for indicating the quantity of gasoline in a fuel tank.

It is the object of my invention to provide a gauge which will indicate at a remote point the height of fluid in a tank.

In particular it is the object of my invention to provide such a gauge in which the flexible communicating means will always be under tension, but never under compression.

It is a further object to provide such a gauge in which there is no direct and positive connection between the float and float arm and the mechanism directly attached to the communicating means.

It is an additional object to provide such a gauge in which the flexible communicating means will be actuated in substantially a straight line adjacent the tank end of the gauge equipment to prevent the flexing and bending of the communicating means when the float rises and falls.

It is a further object of my invention to provide a gauge in which the flexible medium is being constantly pulled against the resistance of the float, so that an accurate registration may be secured at all positions of the float.

It is a further object to provide a gauge in which the sudden upward movements of the float will not be communicated directly to the wire to compress it, thus avoiding kinking and bending of the wire or communicating means. The downward movements of the float are resisted by the yielding connection holding the wire taut, so that the shock is cushioned by the wire, and due to this yielding tension on the wire it can not be kinked or bent.

It is a further object in such a case to permit of the wire being actuated with the float by manual movement of the wire during installation before the equipment is finally attached in completed form, so that it can be determined whether the float is actually working.

It is an object to provide such a feature in combination with a float arm which is not directly attached to the actuating communicating means.

With these several objects in view, the drawings are as follows:—

Figure 1 is a side elevation of the complete equipment, of the tank unit, the communicating means and guide, and the indicator head.

Figure 2 is a front elevation of the indicator head.

Figure 3 is a section on the line 3—3 of Figure 4, disclosing the gas lock at the tank end of the communicating means, together with the lever guiding and actuating the tank end of the communicating means.

Figure 4 is a section on the line 4—4 of Figure 3.

Figure 5 is a section through the indicator head.

Figure 6 is a section through the housing around the indicating means.

Figure 7 is a section through the housings and connector between the communicating means guide and the indicator head.

Figure 8 is a plan view of the indicating drum partially cut away to show the arrangement of the yielding means and the pulley to which the flexible communicating means is connected.

Referring to the drawings in detail:

1 is a float pivotally carried on a float arm 2, which passes through an upstanding eye 3 on a float lever 4. This arm 2, after passing through the eye 3, is extended downwardly and passes through the float lever 4 again, at which point it has a head 5 turned over to prevent it from becoming detached from the float lever. This float lever has a pair of upstanding ears near one end, such ears being designated 6. The ears are provided with apertures through which is passed a transverse bearing shaft 7 carried by the side arms of a U-shaped suspending bracket 8. The end of the float lever 4 adjacent this pivotal support is turned up forming a long shoulder 9, which engages with a wire lever 10, also pivoted on the shaft 7. Both the float lever and the wire lever are freely pivoted upon the shaft 7, and are adapted to move independently of one another, save when the shoulder 9 comes in contact with the lever 10.

The upper free end of this lever is provided with an eye 11, to which is attached the flexible communicating wire 12. The lever travels in a slot 13 in the plate 14, which is connected by screws or otherwise to the tank 15. The screws are designated 16. Mounted on this tank plate is a U-shaped housing 17, in which the free end of the lever 10 and its attached wire travel. This U-shaped housing 17 is closed at one end at 18, and at the other end, through which the wire 12 passes, it is fitted with a tubular extension 19 externally threaded at its outer end as at 20 to receive an internally threaded collar 21, which clamps the wire casings 22, which guide and protect the flexible communicating means 12.

In order to prevent the liquid in the tank seeping out along the wire, due to the splashing of the liquid in the tank, a gasoline lock or barrier is provided, consisting of an annular shoulder 23 brought into close engagement with the wire 12, having a minute aperture 24 through such barrier for the passage of the wire. This opening is so fine, and fits so closely to the wire 12, but without friction, that the gasoline in the tank can not readily find its way by the barrier and pass the wire. The passageway 25 within the projection 19 is sufficiently large to form a reservoir for any surplus gasoline which runs out of such opening due to the tilting of the base upon which the gauge equipment is mounted.

It will be observed that the guiding and protecting housing for the communicating means consists of an external heavily ribbed member 22 and an internal finely wound protecting covering 26. This external covering extends a substantial portion of the length of the wire, where it is subject to the greatest abuse and usage, terminating at its forward end in a clamping collar 27. The internal guiding member or protecting covering 26 runs the full length of the wire up to a point adjacent the indicator. At this point is found a stiff brass tube 28, on one end of which is threaded a collar 29 having a threaded split projection 30 adapted to receive a collar 31 which engages it and the exterior of the guiding housing 26. Proximate this point, the wire is attached to a chain 32, which is conveyed into the interior of the indicator housing and wound upon and attached to a pulley 33, the attachment being at 34.

The tube 28 carries a collar 35, which attaches it to the threaded projection 36, forming a part of the indicator housing.

This indicator housing consists of a shell 37 with a glass front 38, having a shield 39, with a cut-away portion 40, to disclose the numerals on a drum 41. This drum is mounted on a shaft 42, which turns freely in the bracket arms 43 carried on the interior of the housing 37. The pulley 33 is attached to this drum, and turns with it. Located internally of the drum is a plate 44, having studs 45, to one of which one end of a spring 46 is attached, the other end being attached to a stud 47 carried on one of the arms 43. The helical spring 46 serves to exert a pulling action on the wire 12 attached to the arm 10 which is actuated by the shoulder 9 upon the fall of the float 1. In this way the arm 10 will be in contact with the shoulder 9 upon the descent of the gasoline and cause the upper part of the arm 10 to be moved to the right, whereupon the wire 12 will also be moved to the right against the tension of the spring 46. But when the tank is being filled, or when there is a suden surge of the fluid, the float will suddenly move upwardly ahead of the arm 10 and the wire. Such movement of the float, however, will not be communicated directly to the wire 12 because the arm 10 is not secured to the float arm but only moved thereby when the float arm descends. For this reason the lever will be gradually moved by the spring 46, through the communicating means, into position against the shoulder 9.

The indicator head is attached to the dashboard of an automobile by the U-shaped clamp 48 and the attaching bolts 49, with the nuts 50.

It will also be observed that at the tank end of the unit the U-shaped covering 17 is detachable by removing the screws 51 so that adjustments can be made on the tank end of the apparatus.

It will be understood that I desire to comprehend within my invention such modifications as may be fairly embraced within it, and as may be found necessary in adapting it to various conditions in the art in the course of the application of the invention.

Having thus fully described my invention, what I claim as new, and desire to secure by Letters Patent, is:

1. In a gauge equipment, a tank, an indicator, a flexible communicating means operatively connected to said indicator and extending to a point adjacent said tank, yielding means mounted in said indicator and adapted to move said communicating means and indicator in one direction, a wire arm pivotally mounted in said tank and having said communicating means attached thereto at one of its ends, to guide said communicating means in substantially a horizontal path; a float lever and float in said tank, said lever being pivoted adjacent said wire arm, means on said float lever for engaging with said wire arm to move it in one direction as the float descends, said yielding means tending to move said wire arm against said float lever constantly, while maintaining said communicating means under tension, means to house the tank end of said communicating means, means extending from said housing means to protect and guide said communicating means, and means in said extension means to prevent the exit of fluid through said housing from the tank, but to permit of the free passage of the communicating means therethrough.

2. In a gauge equipment, a tank, an indicator, a flexible communicating means operatively connected to said indicator and extending to a point adjacent said tank, yielding means mounted in said indicator and adapted to move said communicating means and indicator in one direction, a wire arm pivotally mounted in said tank and having said communicating means attached thereto at one of its ends, to guide said wire in substantially a horizontal path, a float lever and float mounted in said tank, said lever being pivoted adjacent said wire arm, means on said float lever for engaging with said wire arm to move it in one direction as the float descends, said yielding means tending to move said wire arm against said float lever constantly, while maintaining said communicating means under tension, means to house the tank end of said communicating means, means extending from said housing means to guide and protect said communicating means, means located in said extension means to prevent the exit of fluid from the tank through said housing means, but to permit of the free passage of the communicating means therethrough, and means to guide and protect said communicating means from the extension means to the indicator.

3. In a gauge equipment, an indicator, a tank, a communicating means, means to guide and protect said communicating means, a combination housing and supporting bracket projecting into and supported by said tank and connected to said guiding and projecting means, one end of the communicating means extending into said housing, a wire arm pivoted on said bracket in said tank, having its free end extending into said housing, the free end of said arm being connected to one of said connecting means to guide the latter in a horizontal path, a float lever carrying a float mounted on the same pivot as the wire arm, but moving freely with respect thereto, a shoulder on said float lever for engaging with said wire arm, and yielding means mounted in said indicator and adapted to move said communicating means in one direction against the downward movement of the float and float lever, and adapted to cause said wire arm to follow the movements of the float lever when it moves upwardly.

4. In a gauge equipment, an indicator, a tank, a communicating means, means to guide and protect said communicating means, a combination housing and supporting bracket projecting into and supported by said tank and connected to said guiding and projecting means, one end of the communicating means extending into said housing, a wire arm pivoted on said bracket in said tank, having its free end extending into said housing, the free end of said arm being connected to one end of said connecting means to guide the latter in a horizontal path, a float lever carrying a float mounted on the same pivot as the wire arm, but moving freely with respect thereto, a shoulder on said float lever for engaging with said wire arm, yielding means mounted in said indicator and adapted to move said communicating means in one direction against the downward movement of the float and float lever, and adapted to cause said wire arm to follow the movements of the float lever when it moves upwardly, and means for preventing the exit of fluid from the tank through the housing, but permitting of the free passage of the communicating means therethrough.

5. In a gauge equipment, an indicator, a tank, a communicating means, means to guide and protect said communicating means, a combination housing and supporting bracket projecting into and supported by said tank and connected to said guiding and projecting means, one end of the communicating means extending into said housing, a wire arm pivoted on said bracket in said tank, having its free end extending into said housing, the free end of said arm being connected to one end of said connecting means to guide the latter in a horizontal path, a float lever carrying a float mounted on the same pivot as the wire arm, but moving freely with respect thereto, a shoulder on said float lever for engaging with said wire arm, yielding means mounted in said indicator and adapted to move said communicating means in one direction against the downward movement of the float and float lever, and adapted to cause said wire arm to follow the movements of the float lever when it moves upwardly, means for preventing the exit of fluid from the tank through the housing, but permitting of the free passage of the communicating means therethrough, and a rigid guiding means connected to said indicator and to said guiding and protecting means adjacent the communicating means.

6. In a gauge equipment, a tank unit consisting of a plate, a depending U-shaped bracket, a cut-away portion of said plate adjacent the mouth of said bracket, a transverse shaft carried by the arms of said bracket, a float lever, ears on said float lever for freely suspending said lever on said shaft, an upwardly extending shoulder on said float lever, a wire lever freely mounted on said shaft, adapted to engage with said shoulder, a float arm and float connected to said float lever, an eye in said float lever through which said float arm may be projected and turned over and fastened to the float lever, and a detachable housing mounted on said plate above the free end of said wire lever.

7. In a gauge equipment, a tank unit consisting of a plate, a depending U-shaped bracket, a cut-away portion of said plate adjacent the mouth of said bracket, a transverse shaft carried by the arms of said bracket, a float lever, ears on said float lever for freely suspending said lever on said shaft, an upwardly extending shoulder on said float lever, a wire lever freely mounted on said shaft, adapted to engage with said shoulder, a float arm and float connected to said float lever, an eye in said float lever through which said float arm may be projected and turned over and fastened to the float lever, a detachable housing mounted on said plate above the free end of said wire lever, and means mounted at one end of said housing to permit the passage of a wire and to connect a casing to said housing for said wire, and means in said casing for preventing the escape of liquid therethrough.

In testimony whereof I affix my signature.

WALTER N. FRANK.